United States Patent [19]
Nishijima et al.

[11] Patent Number: 5,391,889
[45] Date of Patent: Feb. 21, 1995

[54] OPTICAL CHARACTER READING APPARATUS WHICH CAN REDUCE READING ERRORS AS REGARDS A CHARACTER IMAGE IF THE CHARACTER IMAGE IS IN CONTACT WITH AN UNNECESSARY IMAGE.

[75] Inventors: Yasuo Nishijima; Takeshi Bashomatsu, both of Tokyo, Japan

[73] Assignee: NEC Corporation, Japan

[21] Appl. No.: 100,754

[22] Filed: Aug. 2, 1993

[30] Foreign Application Priority Data

Aug. 5, 1992 [JP] Japan .................................. 4-208664

[51] Int. Cl.$^6$ ............................................. G06K 7/10
[52] U.S. Cl. ................................. 250/555; 250/556; 382/9
[58] Field of Search ............... 250/555, 556, 563, 566; 235/462, 472, 463; 382/9, 18

[56] References Cited

U.S. PATENT DOCUMENTS

| | | | |
|---|---|---|---|
| 5,253,304 | 10/1993 | LeCun et al. | 382/9 |
| 5,271,067 | 12/1993 | Abe et al. | 382/9 |

FOREIGN PATENT DOCUMENTS

| | | | |
|---|---|---|---|
| 1294710 | 11/1970 | United Kingdom | G06K 9/12 |
| 1359782 | 1/1972 | United Kingdom | G06K 9/02 |
| 2246229 | 7/1991 | United Kingdom | G06K 9/76 |
| 8102482 | 2/1981 | WIPO | G06K 9/34 |

*Primary Examiner*—David C. Nelms
*Assistant Examiner*—Que T. Le
*Attorney, Agent, or Firm*—Laff, Whitesel, Conte & Saret, Ltd.

[57] ABSTRACT

In an optical character reading apparatus for optically reading a character image to produce a character signal representative of the character image, a collation and judgement circuit (22) compares a modified image with each of predetermined reference images memorized in a dictionary (21). A character detecting arrangement (11, 12) detects the character image to produce a detected image. A deleting arrangement (15, 16) partially deletes the detected image to produce a partially deleted image. A modifying arrangement (17, 18) modifies the partially deleted image into the modified image by the use of a reference signal produced in a reference signal producing arrangement (13, 14). It is preferable that the reference signal producing arrangement produces the reference signal in accordance with the detected image.

6 Claims, 4 Drawing Sheets

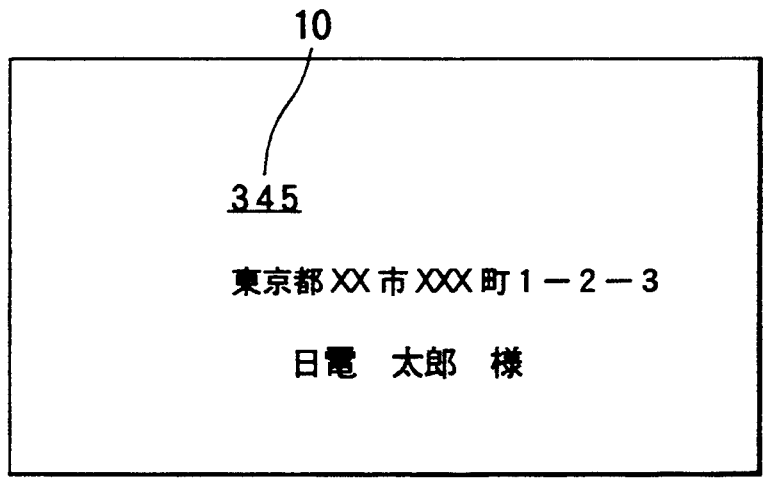
FIG. 2
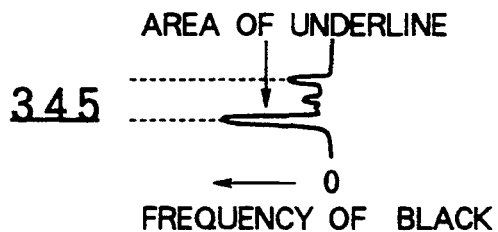
FIG. 3
AREA OF UNDERLINE
3 4 5
← 0
FREQUENCY OF BLACK
FIG. 4
3 4 5
FIG. 5

|3|4|5| ↕ VIRTUAL CHARACTER HEIGHT
FIG. 6
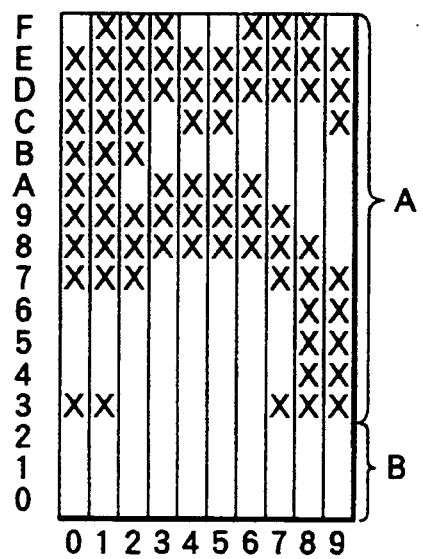
FIG. 7(a)
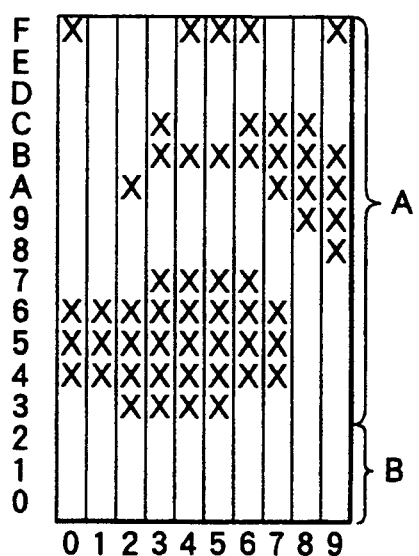
FIG. 7(b)

ered sheet.

OPTICAL CHARACTER READING APPARATUS WHICH CAN REDUCE READING ERRORS AS REGARDS A CHARACTER IMAGE IF THE CHARACTER IMAGE IS IN CONTACT WITH AN UNNECESSARY IMAGE.

BACKGROUND OF THE INVENTION

This invention relates to an optical character reading apparatus for optically reading a character image which is on an object member, such as a mail or a sheet.

Various optical character reading apparatus of the type are already known. The optical character reading apparatus includes a projecting device which is for projecting a light beam towards an object member, such as a mail or a sheet. In the manner known in the art, such an object member has a character image which is provided on a part thereof.

In order to carry out reading operation of the object member, the light beam scans the object member. Responsive to the light beam, the object member image produces a reflected beam. Responsive to the reflected beam, the optical character reading apparatus produces a character signal representative of the character image.

In the manner which will be described in the following description, the optical character reading apparatus includes a character detecting circuit, an image processing circuit, a memory, and a comparison carrying out circuit. The character detecting circuit is for detecting the character image with reference to the reflected beam to produce a detected image. The image processing circuit is for processing the detected image into a processed image. The memory is for memorizing a plurality of predetermined reference images. The comparison carrying out circuit is for carrying out comparison between the processed image and each of the predetermined reference images to produce a compared result signal as the character signal.

It is assumed that an unnecessary image, such as an underline of a frame line, is printed along the character image in contact therewith in order to highlight a position of the character image on the object member. In this event, the detected image comprises an information part and a noise part which are representative of the character image and the underline, respectively. It is assumed that the information part and the noise part are partially overlapped each other. This results in occurrence of an error or failure in the reading operation. This is because it is impossible to correctly discriminate the information part from the noise part.

SUMMARY OF THE INVENTION

It is an object of this invention to provide an optical character reading apparatus which can reduce frequency of reading errors and which can improve a recognition rate even if a character image is in contact with an unnecessary image.

Other objects of this invention will become clear as the description proceeds.

According to this invention, there is provided an optical character reading apparatus for optically reading a character image to produce a character signal representative of the character image. The apparatus includes character detecting means for detecting the character image to produce a detected image, image processing means for processing the detected image into a processed image, memory means for memorizing a plurality of predetermined reference images, and comparison carrying out means for carrying out comparison between the processed image and each of the predetermined reference images to produce a compared result signal as the character signal. The image processing means comprises reference signal producing means for producing a reference signal, deleting means connected to the character deleting means for partially deleting the detected image to produce a partially deleted image, and modifying means connected to the reference signal producing, the deleting, and the comparison carrying out means for modifying the partially deleted image into a modified image by the use of the reference signal to supply the modified image as the processed image to the comparison carrying out means.

BRIEF DESCRIPTION OF THE DRAWING

FIG. 2 is a view illustrating an example of a video signal produced by a photoelectric transducer included in the optical character reading apparatus of FIG. 1;

FIG. 3 is a view for describing operation of a first segmenting circuit included in the optical character reading apparatus of FIG. 1;

FIG. 4 is a view for describing operation of a difference detecting circuit included in the optical character reading apparatus of FIG. 1;

FIG. 5 is a view for describing operation of a noise deleting circuit included in the optical character reading apparatus of FIG. 1;

FIG. 6 is a view for describing operation of a second segmenting circuit included in the optical character reading apparatus of FIG. 1;

FIG. 7(a) is a view for describing operation of a local modifying circuit included in the optical character reading apparatus of FIG. 1;

FIG. 7(b) is a view for describing operation of a reversing circuit included in the optical character reading apparatus of FIG. 1;

DESCRIPTION OF THE PREFERRED EMBODIMENT

Figure 1:
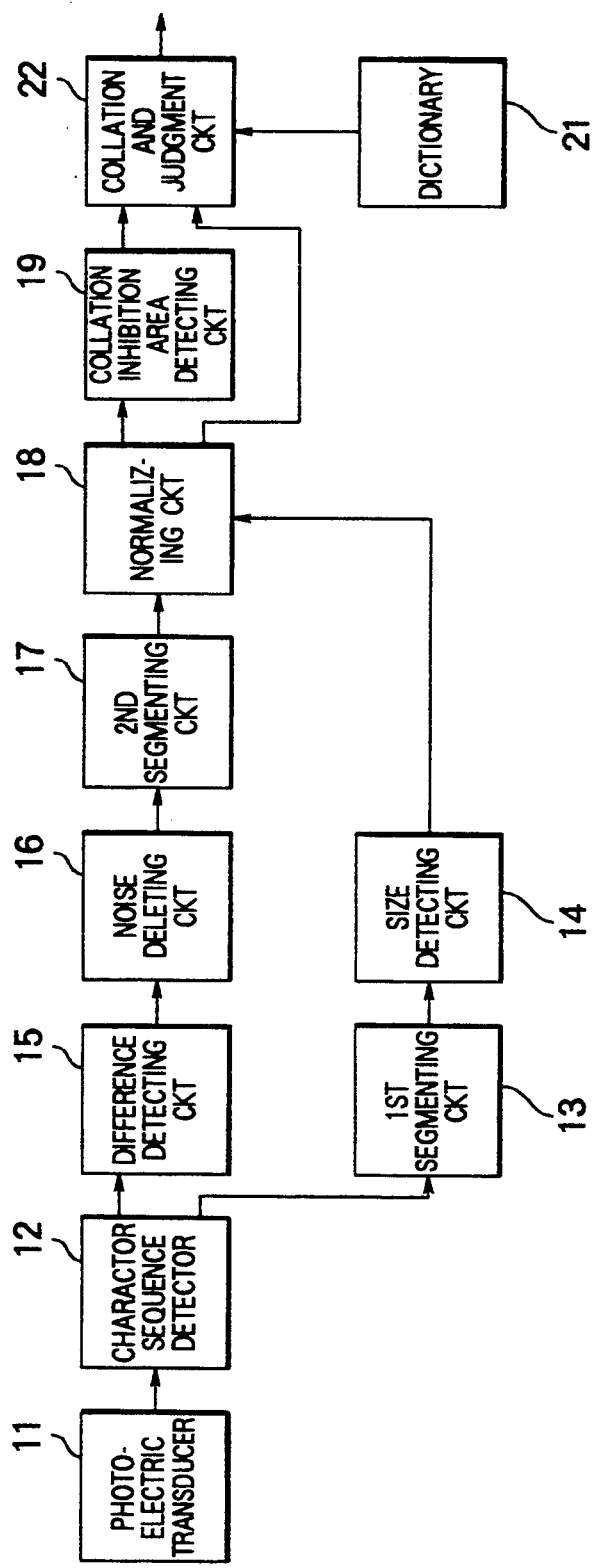
FIG. 1 is a block diagram of an optical character reading apparatus according to an embodiment of this invention.

Referring to FIG. 1, description will be made as regards an optical character reading apparatus according to an embodiment of this invention. The optical character reading apparatus includes a projecting device (not shown) which is for projecting a light beam towards an object member, namely, a mail. In the manner known in the art, the mail has a character image which is provided on a part thereof. In order to carry out reading operation of the mail, the light beam scans the mail. Responsive to the light beam, the character image produces a reflected beam.

The optical character reading apparatus comprises a photoelectric transducer 11 and a character sequence detector 12. The photoelectric transducer 11 is responsive to the reflected beam while scanning a predetermined reading area on the mail and converts the reflected beam into an electric video signal of a binary level. The electric video signal has an example illustrated in FIG. 2. In FIG. 2, a reference numeral 10 represents a postal code which is in contact with an underline. More particularly, the postal code and the underline are partially overlapped each other.

The character sequence detector 12 is connected to the photoelectric transducer 11 and is for detecting a character sequence in response to the video signal to produce a detected image having an information part and a noise part which are partially overlapped each other. The information part represents the postal code. The noise part represents the underline. A combination of the photoelectric transducer 11 and the character sequence detector 12 is referred to as a character detecting arrangement.

The optical character reading apparatus further comprises first segmenting, size detecting, difference detecting, noise deleting, second segmenting, and local modifying circuits 13, 14, 15, 16, 17, and 18. The first segmenting circuit 13 is connected to the character sequence detector 12 and is for segmenting the detected image to produce a first segmented image having a reference size. Namely, the first segmenting circuit 13 segments individual characters one by one. The first segmented image has an example illustrated in FIG. 3. In FIG. 3, a combination of the postal code "345" and the underline is recognized as a single character inasmuch as the single character is fundamentally defined as a rectangle circumscribing a whole character.

The detecting circuit 14 is connected to the first segmenting circuit 13 and is for detecting the reference size to produce a size signal representative of the reference size. More particularly, the size detecting circuit 14 is for detecting a size of each character thus segmented, namely, the height and the width of each circumscribing rectangle and for detecting an average or representative character size. A combination of the first segmenting and the size detecting circuits 13 and 14 is referred to as a reference signal producing arrangement for producing a reference signal corresponding to the size signal.

The difference detecting circuit 15 is connected to the character sequence detector 12. Responsive to the detection image, the difference detecting circuit 15 detects difference between the information part and the noise part to produce a difference signal representative of the noise part.

Referring to FIG. 4, the description will be directed to a principle of detection of the underline. For the detected image, a number of "black" meshes is counted by the use of a projection method which is known in the art. More particularly, frequency of appearance of the "black" meshes is counted in relation to the detected image. Through an analysis of distribution of the "black" meshes, the frequency of the appearance is high in the underline. Therefore, it is possible to detect an area of the underline with reference to the frequency.

Referring back to FIG. 1, the noise deleting circuit 16 is connected to the difference detecting circuit 15 and is for deleting the noise part from the detected image with reference to the difference signal to produce the partially deleted image. In other words, the noise deleting circuit 16 logically removes the underline. FIG. 5 shows an example of a result of operation of the noise deleting circuit 16. In FIG. 5, it is to be noted that the postal code "345" is partially deleted with perfectly deleting the underline. A combination of the difference detecting and the noise detecting circuits 15 and 16 is referred to as a deleting arrangement.

The second segmenting circuit 17 is connected to the noise deleting circuit 16 and is for segmenting the partially deleted image to produce a second segmented image. FIG. 6 shows an example of a result of operation of the second segmenting circuit 17. In FIG. 6, it is assumed that the second segmented image has a virtual size of height as depicted by a dashed line.

The normalizing circuit 18 is connected to the reference signal producing and the second segmenting circuits 14 and 17. With reference to the size signal, the normalizing circuit 18 modifies the second segmented image into a modified image. More particularly, the normalizing circuit 18 sets the virtual size with reference to the average or representative character size and normalizes each character into a constant size. As a result, the modified image is normalized at the virtual size of height depicted by the dashed line in FIG. 6. In this event, normalization must be carried out taking into account a removed or deleted portion so that a gravity center of the character or a center point of the character is not deviated. FIG. 7(a) shows an example of a result of operation of the normalizing circuit 18. In FIG. 7(a), the modified image is represented by a combination of sixteen meshes in a vertical or longitudinal direction and ten meshes in a horizontal or transversal direction and has a main part A and a supplementary part B added to the main part A. The main part A represents a greater part of the character image. The supplementary part B corresponds to the area of the underline. In the manner which will later be described in detail, the modified image is reversed into a reversed image illustrated in FIG. 7(b). In each of the modified and the reversed images, presence of a symbol "x" is represented by a logic "1" level. Absence of the symbol "x" is represented by a logic "0" level.

The normalizing circuit 18 will be referred to as a local modifying circuit. A combination of the second segmenting and the normalizing circuits 17 and 18 is referred to as a modifying arrangement. A combination of the reference signal producing, the deleting, and the modifying arrangements is referred to as an image processing arrangement for processing the detected image into a processed image as the modified image.

The optical character reading apparatus further comprises a collation inhibition area detecting circuit 19, a dictionary or a memory 21, and a collation and judgment circuit 22. The collation inhibition area detecting circuit 19 is connected to the normalizing circuit 18 and is for detecting the supplementary part B to produce a supplementary part signal representative of the supplementary part B.

Figures 8A, 8B, 9:
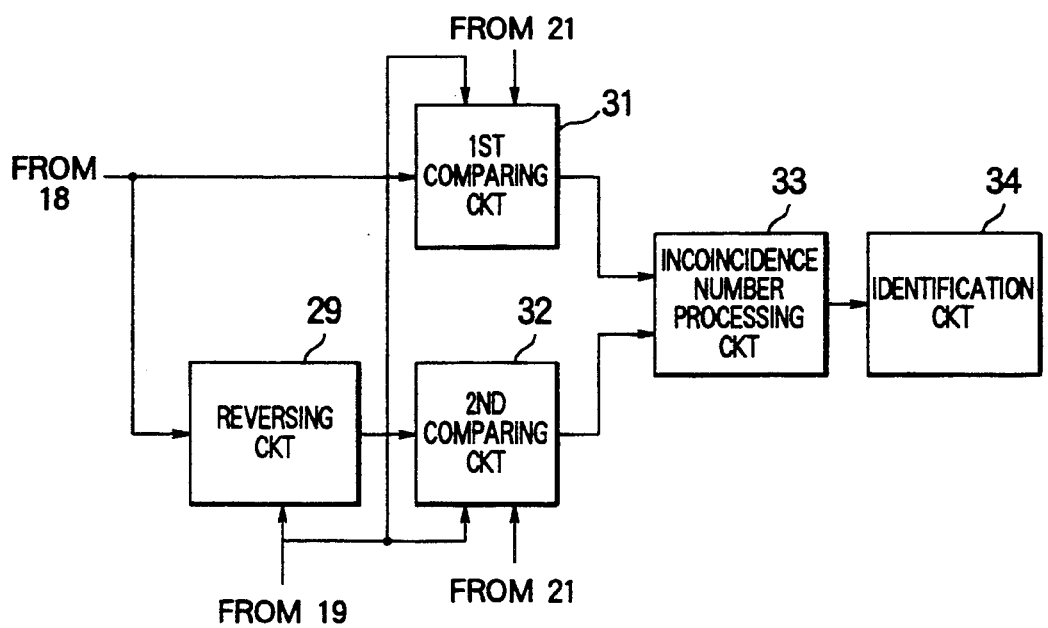
FIG. 8(a) is a view for describing operation of a reversing circuit included in the local comparing circuit of FIG. 9.
FIG. 8(b) shows a first pattern of one of the predetermined reference images memorized in a memory included in the optical character reading apparatus of FIG. 1.
FIG. 9 is a block diagram of a collation and judgment circuit included in the optical character reading apparatus of FIG. 1.

The memory 21 is for memorizing a plurality of predetermined reference images. Each of the predetermined reference images has a first and a second pattern which are illustrated in FIGS. 8(a) and 8(b), respectively. In each of FIGS. 8(a) and 8(b), the reference image is represented by a combination of sixteen meshes in a vertical or longitudinal direction and ten meshes in a horizontal or transversal direction.

One of the predetermined reference images is exemplified as a character category "5" in each of FIGS. 8(a) and 8(b). In the first pattern, a symbol "x" represents a background portion or a white portion of the character category "5". In the second pattern, the symbol "x"

represents a character signal portion or black portion of the character category "5". In each of the first and the second patterns, presence of the symbol "x" is represented by a logic "1" level in the memory 21. Therefore, absence of the symbol "x" is represented by a logic "0".

In the manner which will be described in detail in the following description, the collation and judgment circuit 22 is connected to the normalizing and the collation inhibition area detecting circuits 18 and 19 and to the memory 21 and is for carrying out predetermined comparison between the modified image and each of the predetermined reference images to produce a compared result signal representative of the comparison. When supplied with the supplementary part signal, the collation and judgment circuit 22 is prevented from carrying out the predetermined comparison. Otherwise, the collation and judgment circuit 22 carries out the predetermined comparison. The collation and judgment circuit 22 will be referred to as a local comparing circuit. A combination of the collation inhibition area detecting and the collation and judgment circuits 19 and 22 is referred to as a comparison carrying out arrangement.

Turning to FIG. 9, the description will be made in detail as regards the collation and judgment circuit 22. In the manner which will be described in the following description, the collation and judgment circuit 22 comprises reversing, first comparing, second comparing, incoincidence number processing, and identification circuits 29, 31, 32, 33, and 34. The reversing circuit 29 is connected to the normalizing and the collation inhibition area detecting circuits 18 and 19 and is for carrying out a predetermined reversing operation as regards the modified image to produce the reversed image that is illustrated in FIG. 8. When supplied with the supplementary part signal, the reversing circuit 29 is prevented from carrying out the predetermined reversing operation. Otherwise, the reversing circuit 29 carries out the predetermined reversing operation..

The first comparing circuit 31 is connected to the normalizing and the collation inhibition area detecting circuits 18 and 19 and to the dictionary 21 and is for carrying out first comparison between the modified image and the first pattern of each of the predetermined reference images to produce a first comparison result signal. When supplied with the supplementary part signal, the first comparing circuit 31 is prevented from carrying out the first comparison. Otherwise, the first comparing circuit 31 carries out the first comparison.

More particularly, the first comparing circuit 31 detects coincidence/incoincidence by calculating logical products for every meshes between the modified image and the first pattern of each of the predetermined reference images. Upon incoincidence, an incoincidence signal is supplied as the first comparison result signal to the incoincidence number processing circuit 33. In a region defined by zeroth through ninth transversal rows and zeroth through second longitudinal columns, the logical product becomes "0". Therefore, the incoincidence signal is not produced in the first comparing circuit 31.

The second comparison circuit 32 is connected to the reversing and the collation inhibition area detecting circuits 18 and 29 and to the dictionary 21 and is for carrying out second comparison between the reversed image and the second pattern of each of the predetermined reference images to produce a second comparison result signal. When supplied with the supplementary part signal, the second comparing circuit 32 is prevented from carrying out the second comparison. Otherwise, the second comparing circuit 32 carries out the second comparison.

More particularly, the second comparing circuit 32 detects coincidence/incoincidence by calculating logical products for every meshes between the reversed image and the second pattern of each of the predetermined reference images. Upon incoincidence, an incoincidence signal is supplied as the second comparison result signal to the incoincidence number processing circuit 33. In a region defined by zeroth through ninth transversal rows and zeroth through second longitudinal columns, the logical product becomes "0". Therefore, the incoincidence signal is not produced in the second comparing circuit 32.

The incoincidence number processing circuit 33 is connected to the first and the second comparing circuits 31 and 32 and is for processing the first and the second comparison result signals to produce a counted result signal. More particularly, the incoincidence number processing circuit 33 counts the number of the incoincidence signals with respect to each of the predetermined reference images. The result of count is supplied as the counted result signal to an identification circuit 34.

With reference to the counted result signal, the identification circuit 34 identifies a particular character having a smallest number of incoincidence data and produces a character signal representative of the particular character image.

As described above, when the underline is present within a scanning area, comparison and collation are carried out after eliminating the underline. This increases the rate of correct judgment of coincidence. Thus, the optical character reading apparatus according to this invention is advantageous in that reading errors are reduced while the recognition ratio is improved.

While this invention has thus far been described in conjunction with a few embodiment thereof, it will readily be possible for those skilled in the art to put this invention into practice in various other manners. For example, the normalizing circuit can be formed so that, when the character image from which the underline has been removed is judged as a half-size character with reference to the character width information, normalization is carried out on the basis of the average or representation character size and on the basis of the width information of the half-size character in the character height direction and in the width direction, respectively. The character reading apparatus may include a circuit for detecting presence of a frame when the character image converted by the photoelectric transducer is not in contact with any underline but is surrounded by the frame, and a circuit for removing the frame when the frame is in contact with the character sequence.

What is claimed is:

1. An optical character reading apparatus for optically reading a character image to produce a character signal representative of said character image, said apparatus including character detecting means for detecting said character image to produce a detected image, image processing means for processing said detected image into a processed image, memory means for memorizing a plurality of predetermined reference images, and comparison carrying out means for carrying out predetermined comparison between said processed image and each of said predetermined reference images to produce said character signal, wherein said image processing means comprises:

reference signal producing means for producing a reference signal;

deleting means connected to said character detecting means for partially deleting said detected image to produce a partially deleted image; and modifying means connected to said reference signal producing, said deleting, and said comparison carrying out means for modifying said partially deleted image into a modified image by the use of said reference signal to supply said modified image as said processed image to said comparison carrying out means.

2. An optical character reading apparatus as claimed in claim 1, wherein said reference signal producing means is connected to said character detecting means and is for producing said reference signal in accordance with said detected image.

3. An optical character reading apparatus as claimed in claim 2, wherein said reference signal producing means comprises:

a first segmenting circuit connected to said character detecting means for segmenting said detected image to produce a first segmented image having a reference size; and a size detecting circuit connected to said modifying means and said first segmenting circuit for detecting said reference size to produce a size signal representative of said reference size, said size detecting circuit supplying said size signal as said reference signal to said modifying means.

4. An optical character reading apparatus as claimed in claim 1, said detected image having an information part and a noise part which are partially overlapped each other, wherein said deleting means comprises:

a difference detecting circuit connected to said character detecting means for detecting difference between said information part and said noise part to produce a difference signal representative of said noise part; and a noise deleting circuit connected to said modifying means and to said difference detecting circuit for deleting said noise part from said detected image with reference to said difference signal to produce said partially deleted image.

5. An optical character reading apparatus as claimed in claim 1, wherein said modifying means comprises:

a second segmenting circuit connected to said deleting means for segmenting said partially deleted image to produce a second segmented image; and a local modifying circuit connected to said comparison carrying out and said reference signal producing means and to said second segmenting circuit for modifying said second segmented image into said modified image with reference to said reference signal.

6. An optical character reading apparatus as claimed in claim 1, wherein said modified image has a main part representative of a greater part of said character image and a supplementary part added to said main part, said comparison carrying out means comprises:

a part detecting circuit connected to said modifying means for detecting said supplementary part to produce a supplementary part signal; and a local comparing circuit connected to said modifying and said memory means and to said part detecting circuit for carrying out said predetermined comparison with reference to said supplementary part signal so that said main part is compared with each of said predetermined reference images and that said supplementary part is not compared with each of said predetermined reference images, said local comparing circuit producing said character signal as a result of said comparison.

* * * * *